United States Patent
Boroski et al.

(10) Patent No.: US 8,442,204 B2
(45) Date of Patent: May 14, 2013

(54) REAL-TIME UPDATE OF LOCATION INFORMATION REGARDING A COMMUNICATIONS DEVICE

(75) Inventors: Eileen Kaye Boroski, Elmhurst, IL (US); Thomas W. Klepetka, Lombard, IL (US); Robert Leo Smith, Bensenville, IL (US); Joseph Mueller, St. Charles, IL (US); Michael Jay Nelson, Louisville, CO (US); Daniel Richard Kuzel, Fredericksburg, VA (US)

(73) Assignee: West Corporation, Omaha, NE (US)

( * ) Notice: Subject to any disclaimer, the term of this patent is extended or adjusted under 35 U.S.C. 154(b) by 1494 days.

(21) Appl. No.: 11/679,212

(22) Filed: Feb. 27, 2007

(65) Prior Publication Data
US 2007/0211692 A1    Sep. 13, 2007

Related U.S. Application Data

(60) Provisional application No. 60/781,136, filed on Mar. 10, 2006.

(51) Int. Cl.
*H04M 7/00* (2006.01)

(52) U.S. Cl.
USPC .................... 379/221.14; 379/201.01

(58) Field of Classification Search ............. 379/221.14, 379/201.01
See application file for complete search history.

(56) References Cited

U.S. PATENT DOCUMENTS

2005/0286704 A1* 12/2005 Enzmann et al. ......... 379/221.01
2007/0189492 A1*  8/2007 Heinrichs et al. ........ 379/220.01

* cited by examiner

*Primary Examiner* — Quynh Nguyen

(57) ABSTRACT

An automatic location update system receives location information regarding an identified communications device and stores an identification of the communications device, advantageously its telephone number, and the location information, advantageously X/Y coordinates. Weighting factors associated with the coordinates are also stored. The coordinates and weighting factors thus stored are compared and the coordinates that appear to be the most accurate are selected. The selected coordinates are delivered to a positioning server used to route special number calls.

18 Claims, 6 Drawing Sheets

REAL-TIME UPDATE OF LOCATION INFORMATION REGARDING A COMMUNICATIONS DEVICE

CROSS-REFERENCE TO RELATED APPLICATION

This patent application is related to and claims the benefit of the filing date of U.S. Provisional Patent Application No. 60/781,136 entitled "Real-Time Update of Location Information Regarding a Communications Device," which was filed on Mar. 10, 2006 by Eileen Boroski, Robert Smith, Michael Nelson, Tom Klepetka, Patti McCalmont, Joe Mueller and Daniel Kuzel, and which is incorporated by reference in its entirety.

BACKGROUND OF THE INVENTION

The present invention is directed to real-time updating of location information regarding a communications device, and, more specifically, to automatically updating location information prior to call placement for call routing purposes. Further, when there are multiple location determinations for the same communications device, embodiments of this invention select one of the locations based on differentiation factors.

Many special number services use the location of the calling communications device in order to route the call to an answering point that handles such calls. For example, calls to emergency service numbers (such as "9-1-1" in the US and Canada and "1-1-2" in most of Europe) are routed to a public safety answering point (PSAP) that serves the emergency services zone (ESZ) wherein the calling communications device is located, so that the operator can dispatch local police, fire, ambulance, etc., to the location of the caller.

Currently, there are three types of communications devices that use special number services: landline, wireless and voice over Internet Protocol (VoIP). Landline devices, for which most special number services were devised, are stationary. Hence, a simple database that relates the telephone number to the serving answering point has been and is sufficient for routing special number calls based on the location of the communications device.

Wireless communications devices, by their nature, are intended to be mobile. Several systems have recently been devised to relate the wireless communications device's geographic location to the ESZ in which it is located in real time. Some of these location determination systems are based on having an embedded GPS device in the communications device. Other systems use the known location of the serving cell site and then narrow down the specific location of the wireless communications device using signal strength, radio signal triangulation, etc.

VoIP communications devices, however, have characteristics of both landline and mobile communications devices. Specifically, when in use, VoIP communications devices are connected by wire lines to a data network. However, VoIP communications devices may be disconnected and reconnected in virtually any location of the data network. These VoIP communications devices are considered to be "nomadic." Some VoIP service providers require that the subscriber of a VoIP communications device register location before the device may be used in a new location. This requirement helps in long-term situations, when the device is not moved frequently. However, if a subscriber encounters an emergency situation while moving about, he or she may not have time to register before making an emergency call.

Further, some VoIP communications devices are wireless, which means that these VoIP communications devices connect to a data network via radio signals at a radio to network interface (e.g., an access point). Such VoIP communications devices are similar to wireless communications devices, but operate in an entirely different manner. Therefore, the location determination systems developed for wireless communications devices do not necessarily work for wireless VoIP communications devices.

A complicating factor to determining the location of a VoIP communications device is that there are competing technologies that uses different methods to determine location. For example, GPS devices are well known in the art and are being incorporated in some VoIP communications devices and wireless communications devices. As is known in the art, GPS devices receive a plurality of satellite signals and resolve the signals into a location. The satellite signals, however, are generally difficult to receive in buildings and urban areas, which limits the effectiveness of GPS-only systems.

A system developed by Rosum, Inc. (www.rosum.com) uses both GPS and television signals to determine location. This system samples local television signals and compares them to the signals received at a known location. The relative difference provides a location of the communications device. By using television signals as well as GPS, this system can operate indoors and in urban areas where GPS signals are not received accurately, if at all.

Another method to determine the location of a communications device is provided by Skyhook Wireless, Inc. (www.skyhook.com). This system uses a plurality of Wi-Fi signals from various known access points to determine location. This system solves the problem of determining location indoors and in urban areas, because Wi-Fi is generally prevalent in these areas. This system is limited, however, to those locations were there are enough known Wi-Fi access points to determine location and by the relatively low Wi-Fi signal strength transmitted from the access point.

A further method to determine the location of a device is provided by S5 (www.s5w.com). This system uses a plurality of relatively low speed, spread spectrum Wi-Fi signals from a source to a plurality of antennas at known positions to determine location. This system works over a longer distance than high-speed Wi-Fi and can work indoors as well as outdoors. Low-speed, spread spectrum Wi-Fi, however, is not widely deployed and thus not available in all areas.

Therefore, a problem in the art of location-based routing of special number calls is that there is no system for selecting one location from a plurality of locations determined by a plurality of location determination methods to update a routing database.

SUMMARY OF THE INVENTION

This problem is solved and a technical advance is achieved in the art by a system and method that automatically updates location-based special number routing information in a positioning server used to route special number calls. The location information is selected from one or more locations provided by a plurality of location determination services.

In accordance with one aspect of this invention, the automatic location update system receives location information regarding an identified communications device, either periodically (a proactive method) or responsive to a request (a reactive method). The automatic location update system stores an identification of the communications device, advantageously its telephone number (TN), and the location information, advantageously X/Y coordinates. In accordance with another aspect of this invention, weighting factors associated with the coordinates and equipment used are also stored. The coordinates and weighting factors thus stored are compared and the coordinates that appear to be the most accurate are selected. The selected coordinates are delivered to the positioning server used to route special number calls.

In this manner, the location of an identified communications device is determined with a high degree of accuracy and regardless of the technology used by the location determination service before such location determination is needed. Therefore, location-based routing of special number calls from nomadic and mobile communications devices can be provided automatically and with a high degree of accuracy when required.

BRIEF DESCRIPTION OF THE DRAWINGS

A more complete understanding of this invention may be obtained from a consideration of this specification taken in conjunction with the drawings, in which.

DETAILED DESCRIPTION

The present invention relates to routing of a special number call to a pre-assigned answering point based on the location of the calling communications device. The various embodiments of this invention are described in terms of the special number call being an emergency services call, also referred to herein as a "9-1-1 call." While this invention is described in terms of emergency services or 9-1-1 call processing, one skilled in the art will realize that this invention is applicable to any special number call after studying this specification. As is known in the art, a 9-1-1 call is routed to a public safety answering point (PSAP) that service the emergency services zone (ESZ) wherein the calling communications device is located. The various embodiments of this invention are described in terms of the calling communications device comprising a nomadic or mobile VoIP communications device. One skilled in the art will realize that the principles of this invention have a much broader application after studying this specification. For example, the elements of this invention may be applied to wireless communications devices and even to land line communications devices with little or no modification.

Further, location is described herein in terms of X/Y coordinates. The use of X/Y should also be interpreted to include X, Y and Z coordinates, specifically latitude, longitude and altitude.

Figure 1:
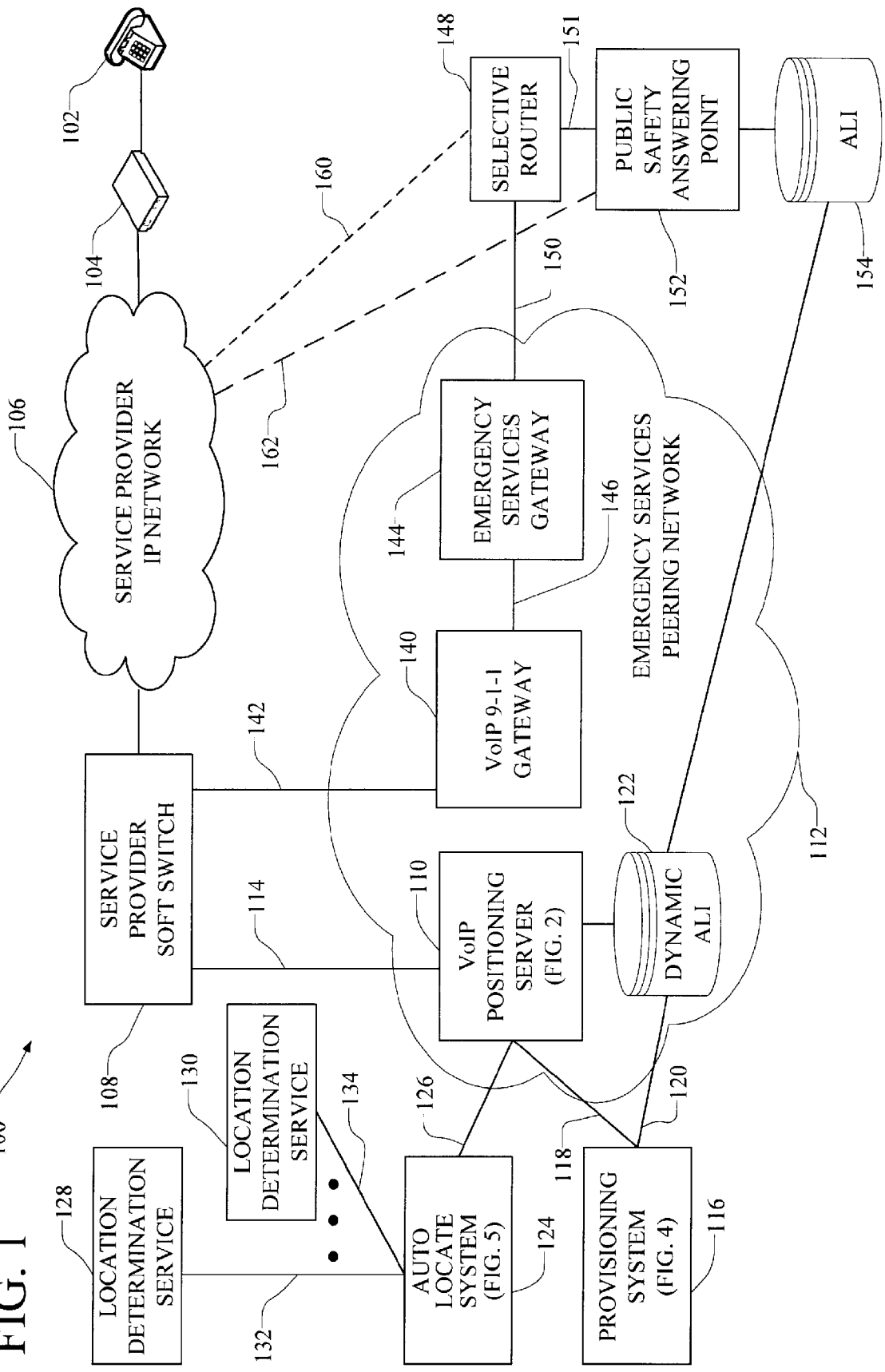
FIG. 1 illustrates a block diagram of a communications network in which an auto locate embodiment of the present invention operates.

In order to understand the importance of this invention, an environment in which this invention operates is first described. FIG. 1 illustrates a communications network 100 in which an exemplary embodiment of this invention operates. This exemplary embodiment of this invention is described herein in the context of a voice over Internet Protocol (VoIP) telephone making a special services call (a "9-1-1 call") to an emergency services number answering point, or PSAP. Because routing a call to a local PSAP requires location-based parameters, this embodiment is described in the context of routing a call based on the location of the calling communication device. One skilled in the art will appreciate how to modify this invention to effect voice or data routing for predetermined destinations based on one or more parameters after studying this specification.

In the communications network 100 of FIG. 1, a VoIP communications device is represented by VoIP-enabled telephone 102. VoIP communications device 102 is connected to a cable or digital subscriber line (commonly known as "DSL") modem 104. Modem 104 provides an interface between VoIP communications device 102 and a service provider Internet protocol (IP) network 106. As is known in the art, the subscriber of VoIP communications device 102 places a call by dialing a number in the same manner as used in the art for many years. However, VoIP communications device 102 actually initiates communications by modem 104 formatting and sending a message to a service provider soft switch 108 through service provider IP network 106. The message includes the dialed number ("9-1-1" for an emergency services call in the U.S. and Canada) and an identification of VoIP communications device 102, which generally comprises the telephone number (TN) of VoIP communications device 102, its IP address or both or any unique identifier(s) provided by the Service Provider IP Network.

Service provider soft switch 108 determines how to route the call based on the dialed number and the TN. In order to route a 9-1-1 call from VoIP telephone 102 to its serving PSAP, service provider soft switch 108 needs routing instructions. In this exemplary embodiment of this invention, service provider soft switch 108 obtains routing instructions from VoIP positioning server 110, which comprises part of emergency services peering network 112. For a more complete description of emergency services peering network 112, see "Peering Network for Parameter-Based Routing of Special Number Calls," by Ashish Patel, U.S. Provisional Patent Application 60/729,673, filed Oct. 25, 2005, and "Peering Network for Parameter-Bases Routing of Special Number Calls," by Ashish Patel, Stephen Meer, Michael DeWeese and Carlton Smith, U.S. patent application Ser. No. 11/457,600, filed Jul. 14, 2006, both of which are incorporated by reference herein in its entirety.

VoIP positioning server 110 is connected to service provider soft switch 108 via link 114. In this exemplary embodiment, link 114 comprises an IP link. One skilled in the art will appreciate that link 114 may be any form of signaling link or network (such as, but not limited to, an SS7 network) after studying this specification. As will be described more fully, below in connection with FIG. 2, VoIP positioning server 110 maintains and updates location information associated with telephone numbers, PSAP ID's related to ESZ boundaries and PSAP ID's related to routing information.

Figure 2:
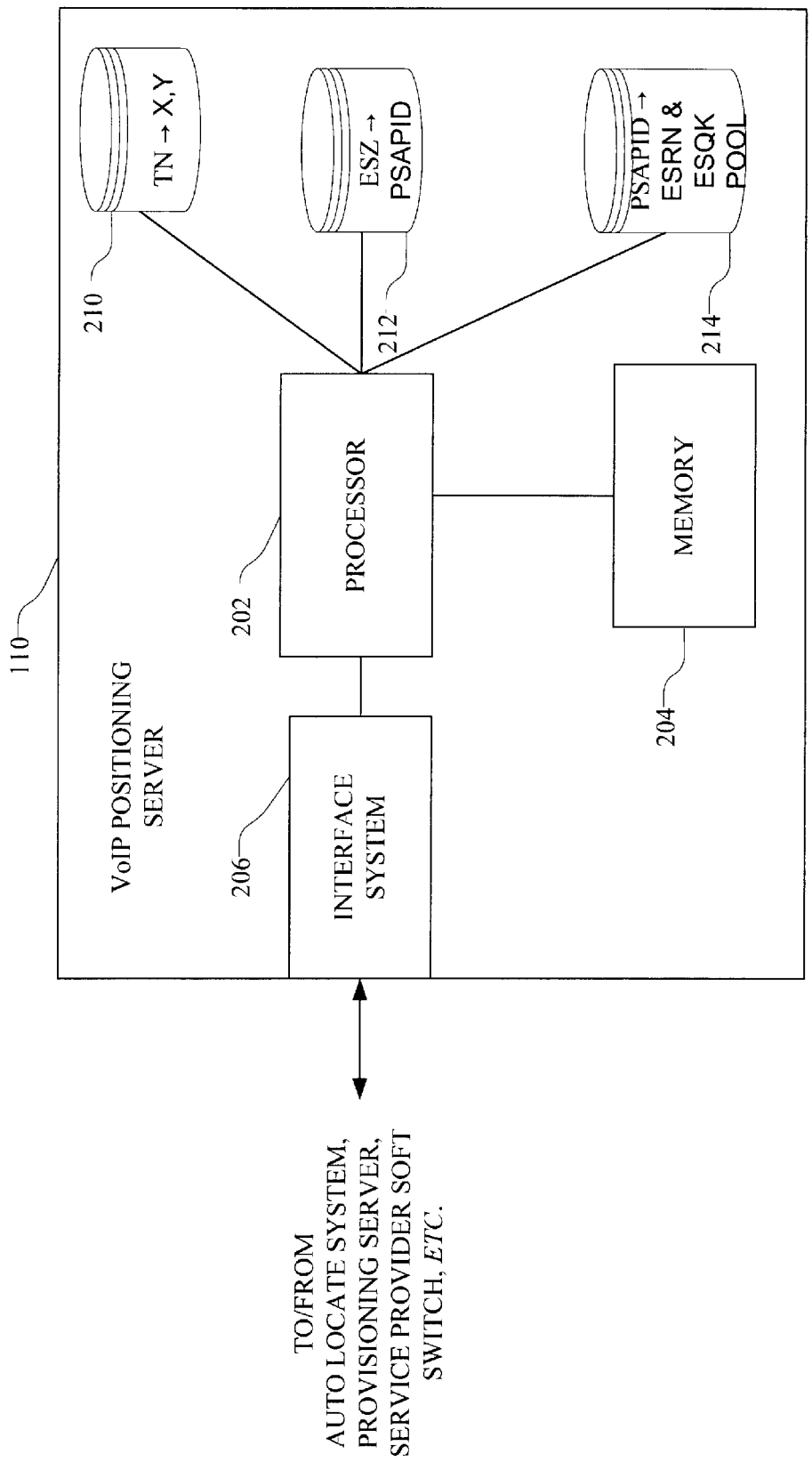
FIG. 2 is a block diagram of the VoIP positioning server of FIG. 1.

Turning now to FIG. 2, a block diagram illustrating the functional blocks of VoIP positioning server 110 is shown. VoIP positioning server 110 includes a processor 202 that operates and controls the functionality of VoIP positioning server 110. Processor 202 is connected to memory 204, which stores operational code, operational parameters, etc., as is known in the art. One or more interface systems, represented by interface system 206, connects VoIP positioning server 110 to service provider soft switch 108 and other operational units. If VoIP positioning server 110 is connected to, for example, a data network, then interface system 206 comprises a data termination on the data network. Alternatively, if VoIP positioning server 110 is connected to a plurality of dedicated links, then interface system 206 comprises a plurality of communication interfaces that translate between each link's protocol and data usable by processor 202, and vice versa.

Importantly, VoIP positioning server 110 includes three databases, 210, 212 and 214. Database 210 includes a mapping of TN's to their respective X/Y coordinates. Database 212 includes a mapping of ESZ's to PSAP ID's. Database 214 includes a mapping of PSAP ID's to emergency services routing numbers (ESRN's) and a pool of emergency services query keys (ESQK's).

In operation, VoIP positioning server 110 receives a TN at interface system 206, which passes the TN to processor 202. Processor 202 uses the TN as a query key into database 210 to determine the X/Y coordinates associated with the TN. Processor 202 next applies the X/Y coordinates to database 212. The X/Y coordinates are compared to the polygons that are described by the ESZ's to determine which ESZ serves the X/Y (location) associated with the TN.

Processor 202 thus obtains a PSAP ID and applies this PSAP ID to database 214. Processor 202 obtains an ESRN and selects a free ESQK. ESRN is used to route the call to a selective router. The ESQK is used by the selective router to select a PSAP. The PSAP uses the ESQK to determine the TN and location of the calling communications device, as will be described further, below. Processor 202 stores the ESQK and TN for further use (described below) and returns the ESRN and ESQK via interface system 206.

Returning to FIG. 1, TN to X/Y database 210 is initially provisioned (also called "populated") by provisioning system 116. As will be described in more detail below in connection with FIG. 4, provisioning system populates database 210 when new TN's are added and when a subscriber manually enters a change of location. The TN-to-X/Y change is delivered over link 118 to VoIP positioning server 110. Links 118 and 120 may be dedicated links or may represent a connection through a data network.

A problem in the art, however, is that provisioning system 116 may not provide updates to TN-to-X/Y database 210 in a timely manner. For example, the user of VoIP telephone 102 may move VoIP telephone 102 and not manually update its position. Further, the user of VoIP telephone 102 may connect to service provider IP network 106 specifically for the purpose of calling 9-1-1, in which case the subscriber may not have time to update the location manually.

This problem is solved by an auto locate system 124 in accordance with this invention. As will be described more fully below in connection with FIG. 5, auto locate system 124 updates TN-to-X/Y database 210 in VoIP positioning server 110 with the most accurate and recent X/Y location information that is available for each TN. Auto locate system is connected to VoIP positioning server 110 via link 126. Link 126 may be a dedicated data link or may be a connection through a data network. One skilled in the art will realize that links 118, 120 and 126 may all be connections through the same network or any combination of dedicated links and network connections.

Auto locate system 124 receives location information from one or more location determination services, represented by location determination service 128 and location determination service 130. Location determination services 128 and 130 are illustrated herein as being connected to auto locate system 124 via dedicated links 132 and 134, respectively. Again, links 132 and 134 may be dedicated links or may comprise a connection through a network or a combination thereof.

In accordance with one aspect of this invention, the plurality of location determination services, which includes location determination services 128 and 130, comprise diverse technologies. Further, each of the plurality of location determination services, which includes location determination services 128 and 130, may determine the location of communications devices periodically, on request of auto locate system 124 or responsive to other stimuli.

Continuing now with the description of emergency services peering network 112 in FIG. 1, Emergency services peering network 112 includes VoIP 9-1-1 gateway 140. VoIP 9-1-1 gateway 140 is connected to service provider soft switch 108 via one or more links 142. Such links may be IP links, PRI links or time-division multiplexed (TDM), Optical (DWDM) links, including, but not limited to, dedicated lines and trunks. VoIP 9-1-1 gateway 140 may comprise a plurality of VoIP 9-1-1 gateways, may be connected to multiple service provider soft switches, or both.

In accordance with this exemplary embodiment, VoIP 9-1-1 gateway 140 is also connected to one or more emergency services gateways, represented by emergency services gateway 144, via a private network connection 146, which, in this exemplary embodiment, comprises an IP network. Emergency services gateway 144 comprises the egress of emergency services peering network 112. Thus, emergency services gateway 144 is connected to one or more selective routers, represented by selective router 148, by one or more links 150. Links 150 preferably comprise links that are native to each selective router 148. Link 151 between selective router 148 and PSAP 152 comprises an comprises one or more CAMA or enhanced multi-frequency trunks, as is known in the art.

As is known in the art, selective router 148 is connected to a plurality of PSAP's, represented here by PSAP 152. PSAP 152 is connected to automatic location information (ALI) database 154 (also known in the art as a "regional ALI") that provides PSAP 152 with location and other information regarding a caller.

Figure 3:
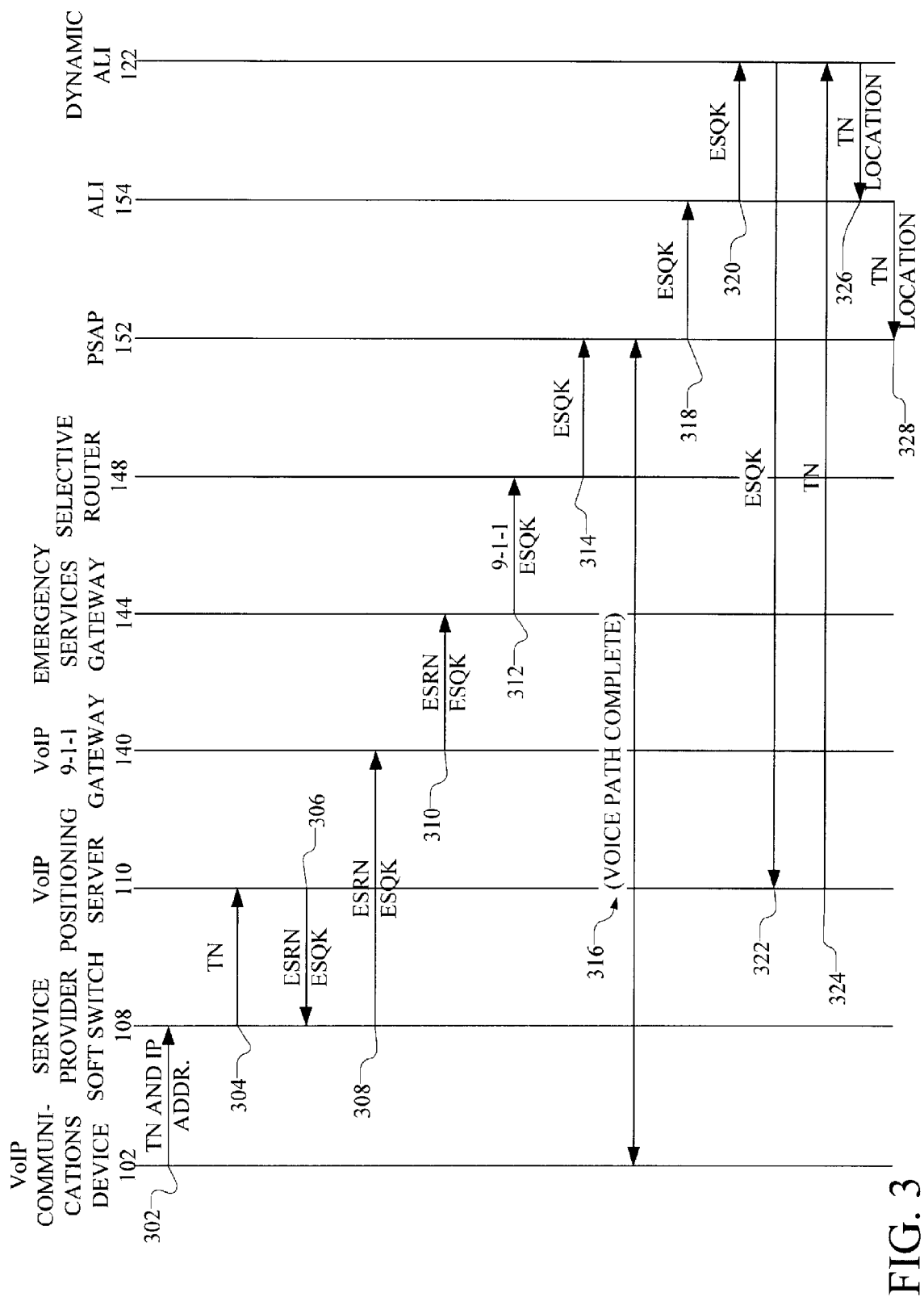
FIG. 3 is a call flow diagram of a special number call from a communications device to its local answering point in the context of FIG. 1.

An emergency services call between VoIP telephone 102 and its local serving PSAP 152 is now described in the context of the call flow of FIG. 3 taken in conjunction with communications network 100 of FIG. 1. While this exemplary embodiment is described in terms of the U.S. and Canadian 9-1-1 emergency services number, one skilled in the art will understand how to modify the described embodiment of this invention to any emergency service number (e.g., 1-1-2) and to non-emergency numbers (e.g., 1-1-3).

The call flow of FIG. 3 begins at 302 wherein the user of VoIP communications device 102 dials 9-1-1 and the call is sent into service provider IP network 106. The initial message includes at least the TN of the VoIP communications device 102. The call is received at the service provider soft switch 108 wherein digit analysis is performed. In 304, service provider soft switch 108 determines that the call is a 9-1-1 call and requests routing instructions from VoIP positioning server 110, passing the TN of the calling communications device. VoIP positioning server 110 determines the currently-registered location of VoIP communications device 102 and, in step 306, delivers an ESRN and an ESQK, as described above in connection with FIG. 2.

At step 308 service provider soft switch 108 has all of the information necessary to route the emergency call from VoIP communications device 102 to its local PSAP, which in this exemplary embodiment is PSAP 152. Service provider soft switch 108 connects the emergency services call to VoIP 9-1-1 gateway 140 via communication path 142 and passes the ESRN and ESQK. VoIP 9-1-1 gateway 140 selects emergency services gateway 144 from the one or more emergency services gateways to which it is connected, based on the ESRN. VoIP 9-1-1 gateway 140 then connects the voice path of the call to emergency services gateway 144 via link 146 and forwards the ESRN and ESQK at step 310.

At step 312, emergency services gateway 144 selects a selective router from the plurality of selective routers to which it is connected, based on the ESRN. In this exemplary embodiment, emergency services gateway 144 selects selective router 148. Emergency services gateway 144 connects the voice path to selective router 148 via link 150 and forwards 9-1-1 and ESQK. Thus, the call appears to be just another 9-1-1 call to selective router 148.

Selective router 148 uses the ESQK assigned to the call by VoIP positioning server 110 to select the PSAP to route the call to. Thus, in step 314, selective router 148 connects the emergency services call from VoIP communications device 102 to PSAP 152 via dedicated trunks, such as CAMA trunks as practiced in this art for many years. Step 316 emphasizes that the voice path between VoIP communications device 102 and its local PSAP, PSAP 152, is now complete.

Continuing with FIGS. 1 and 3, PSAP 152 requests information from ALI database 154 regarding the ESQK at step 318. ALI 154 recognizes the ESQK as a special case ANI associated with dynamic ALI 122. In step 320, ALI 154 requests information associated with the ESQK from dynamic ALI 122. Dynamic ALI 122 requests the TN associated with the ESQK from VoIP positioning server 110 in step 322. The TN of VoIP communications device 102 is returned in step 324. Dynamic ALI 122 delivers the actual TN and the location of VoIP telephone 102 back to ALI 154 in step 326. Finally, in step 328, ALI 154 delivers the actual TN of VoIP communications device 102 and its location to PSAP 152.

One skilled in the art will recognize that once service provider soft switch 108 obtains the ESRN and ESQK from VoIP positioning server 110, it may route the call through other paths. For example, service provider soft switch 108 may use the ESRN to route the call through service provider IP network 106 to selective router 148 via path 160 (shown as a dashed line). This scenario assumes that selective router 148 is either connected to a gateway in service provider IP network or can send and receive IP calls. Further, service provider soft switch 108 may route the call through service provider IP network 106 directly to PSAP 152 via path 162 (shown as a dashed line). This scenario assumes that PSAP 152 supports one or more connections to an IP network or that PSAP 152 comprises VoIP operator terminals.

Figure 4:
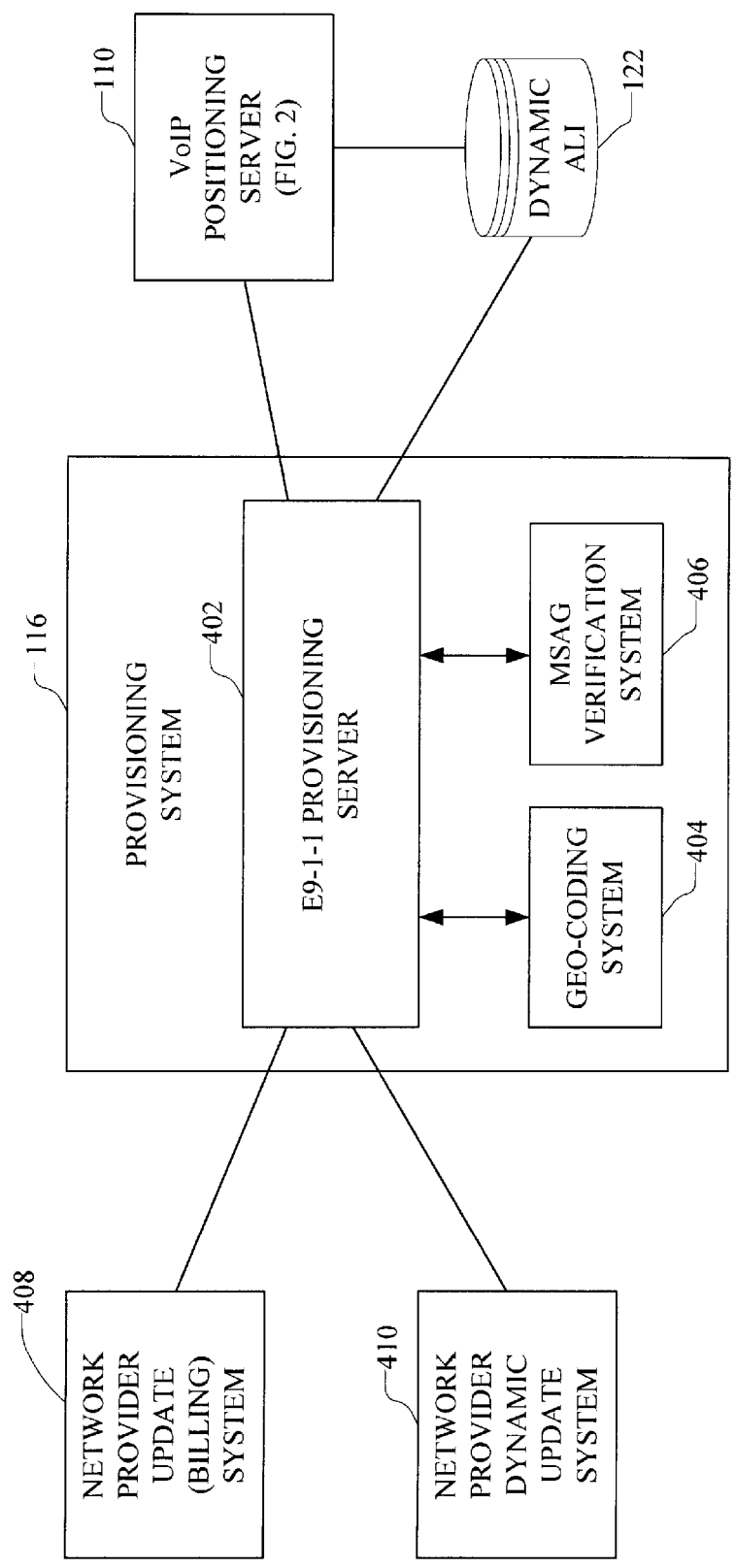
FIG. 4 illustrates a block diagram of the provisioning system of FIG. 1.

Turning now to FIG. 4, a block diagram is shown of the major functional aspects of the provisioning system 116 of FIG. 1. Provisioning system 116 generally comprises an E9-1-1 provisioning server 402, a geo-coding system 404 and a master street address guide (MSAG) verification system 406. Provisioning system 116 generally accepts data from one or more network provider update systems, represented by network provider update system 408 and from one or more network provider dynamic update system, represented by network provider dynamic update system 410. Provisioning system provides information to populate the TN-to-X/Y database 210 (FIG. 2) in VoIP positioning server 110 and information (generally comprising TN-to-MSAG information) to populate dynamic ALI 122.

In operation, a network service provider delivers a plurality of records comprising new or changes to subscriber information from its network provider update system 408 (which may also comprise its billing system), which are generally received as a batch. Alternatively, a subscriber may update his/her own information at, for example, the service provider's web site. The network provider's dynamic update system 410 provides these records to provisioning system 116 as they are entered. In either case, there records generally comprise a TN and a street address.

The update records are received at the E9-1-1 provisioning server 402 of provisioning system 116. E9-1-1 provisioning server 402 determines the X/Y coordinates of the record's address by sending the address to geo-coding system 404. Geo-coding system 404 may be local to provisioning system 116 or may be a separate service from a geo-coding service provider. The address is also put into MSAG format and verified at MSAG verification system 406. After geo-coding and MSAG verification, E9-1-1 provisioning server delivers the record to VoIP positioning server 110 and to dynamic ALI 122.

As can be seen in the above description, the subscriber must update his or her own information after the initial service order is placed. The subscriber, however, may not be willing or able to update his or her information every time the VoIP telephone is connected to the service provider's IP network. In fact, the subscriber may not necessarily know the address where he or she is currently located. As a result, several technologies have been developed by various service providers to determine the subscriber's location automatically. A problem in the art, however, is to coordinate these various systems and to integrate them into the architecture as described above in connection with FIGS. 1-3.

Figure 5:
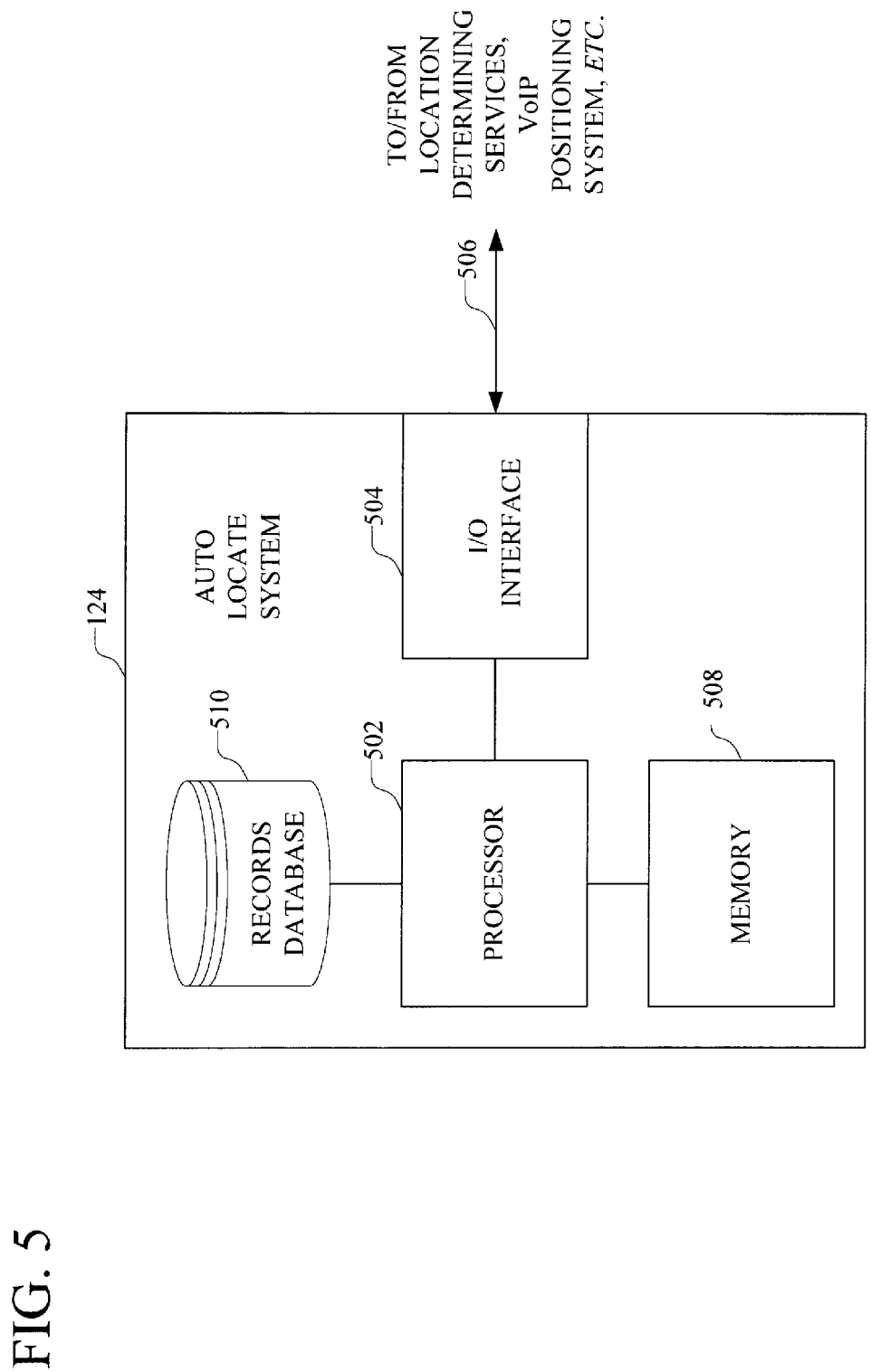
FIG. 5 illustrates a block diagram of the auto locate system of FIG. 1 in accordance with an exemplary embodiment of this invention.

Turning now to FIG. 5, an auto locate system 124 in accordance with this invention is shown in block diagram. Auto locate system 124 includes, at its core, a processor 502 that controls the operations of auto locate system 124. Processor 502 is connected to one or more input/output (I/O) interfaces, represented by I/O interface 504. I/O interface is connected to one or more data lines 506. If auto locate system receives all of its input from a data network, such as the Internet or a secured private network, then I/O interface 504 comprises a network interface and data line 506 comprises a network connection. If I/O interface 504 comprises a single data termination, then data line 506 represents a dedicated data link. One skilled in the art will realize that many combinations of networks, dedicated lines or both will be required by the specific implementation after studying this specification.

Processor 502 is also connected to memory 508 where operating instructions, data or both are stored. Processor 502 is further connected to records database 510. Processor 502 uses records database to store TN's and their relative X/Y coordinates received from one or more of the plurality of location determination services, which are represented here by location determination services 128, 130 (FIG. 1). When processor 502 determines that the X/Y coordinates need to be updated for a particular TN, it sends the TN, X/Y pair to VoIP positioning server 110 to update its TN-to-X/Y database 210. Advantageously, VoIP positioning server 110 forwards the TN, X/Y pair to dynamic ALI 122 to update the X/Y for the TN in its database.

Auto locate system 124 updates VoIP position server 110 for a TN upon occurrence of one or more of the following events:

1. By request of an operator;
2. By request of a subscriber;
3. Upon receipt of an X/Y from a location determination system;
4. Upon receipt of raw location data;

5. Time-related event; and
6. Triggered Event (e.g., an LDT becomes available or an LDT becomes inaccessible).

For example, an operator may request an update if the data displayed appears to be incorrect. Further, a subscriber may request an update by, for example, dialing a special code. Additionally, an update may be requested automatically when a caller dials a special services number, such as 9-1-1. Of course, an update of X/Y coordinate may be performed periodically.

In accordance with one aspect of this invention, auto locate system 124 receives raw data regarding a VoIP communications device from, for example, a soft switch or server in service provider IP network 106. Auto locate system 124 then sends the raw data to one or more of the location determination systems for conversion into X/Y coordinates.

In accordance with another aspect of this invention, auto locate system 124 selects which X/Y to deliver to VoIP positioning server 110 responsive to a table-driven algorithm when there is more than one X/Y associated with a TN.

An exemplary data structure includes the data in Table I.

TABLE I

TN
User Type (Static, Nomadic, Mobile)
Sample Data
    Timestamp
    Longitude
    Latitude Altitude
    Longitude Uncertainty
    Latitude Uncertainty
    Altitude Uncertainty
    Location Technology Accuracy
    Weather Conditions
    Location Conditions Generally, the "Timestamp" is the most important field. The more recent the updated location, the more likely the location is correct. However, if more than one location determination service provides location information within a predetermined time, then one or more of the other factors are taken into consideration. For example, uncertainty information may be taken into account for each location determination. Additionally, weighting factors for the accuracy of the location determination technology may also be used. Further, if weather conditions are known to be adverse to a particular technology, then a weighting factor may be used in determining whether to use an X/Y. Finally, the X/Y itself may have known conditions that make calculations uncertain (e.g., canyons or building density).

Figure 6:
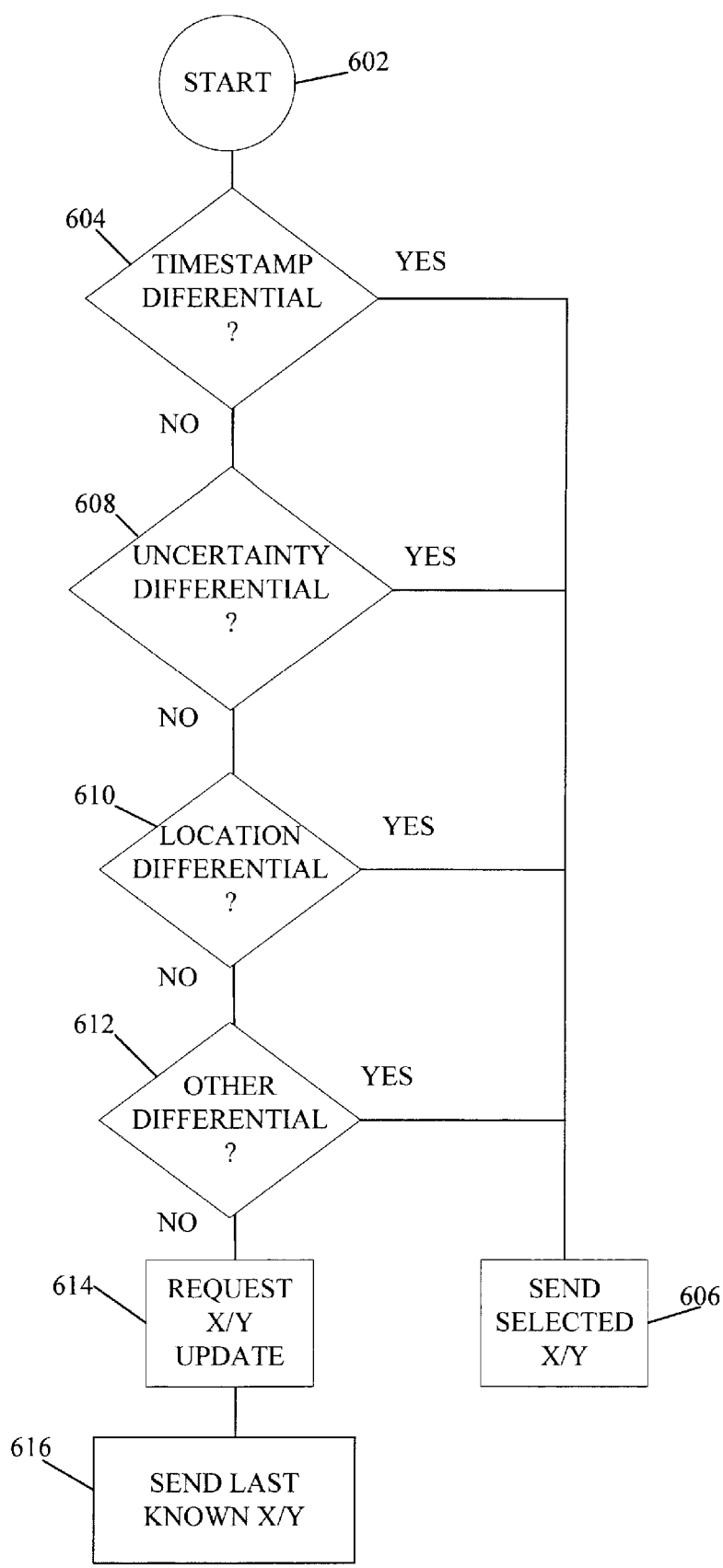
FIG. 6 is an exemplary flow diagram of operation of the auto locate system of FIG. 5.

Turning now to FIG. 6, an exemplary flow of control operations of an auto location system 124 is shown. Processing starts at circle 602 responsive to, for example, a periodic check or receipt of an X/Y, as discussed above. Processing moves to decision diamond 604 where a decision is made as to whether there is a time differential between or among records. A time differential, in this exemplary embodiment, means that one record is more recent than the other(s) by a predetermined amount of time. If there is a time differential, then the record is selected and the X/Y is delivered to VoIP positioning server 110 in box 606.

If there is not a significant time differential at decision diamond 604, then processing proceeds to decision diamond 608, where a determination is made whether there is an uncertainty differential. If one of the records has an uncertainty level below a predetermined threshold, then that record is selected and delivered to VoIP positioning server 110 in box 606. If there is not a significant uncertainty differential in decision diamond 608, then a determination is made in decision diamond 610 whether there is a location differential. If one of the records has a location weight lower than a predetermined threshold, then that record is selected and delivered to VoIP positioning server 110 in box 606.

If a differentiation cannot be made based on location, then one or more differentiators may be used in decision diamond 612. If one record cannot be selected based on the differentiators then a new X/Y is requested in box 614 and the last known X/Y coordinates are sent in box 616. One skilled in the art will appreciate that there are many ways to differentiate between or among these records. By way of example and not by way of limitation, another way to differentiate between or among records may be based upon reliability of information in the records (embodying herein a differential comprising a reliability factor).

It is to be understood that the above-described embodiment is merely illustrative of the principles of the present invention and that many variations of the above-described embodiments can be devised by one skilled in the art without departing from the scope of the invention. It is therefore intended that such variations be included within the scope of the following claims and their equivalents.

The invention claimed is:

1. A method for automatically updating routing information for routing of special number calls comprising:
receiving a plurality of routing parameters relating to a communications device from a plurality of sources;
determining a differential related to the plurality of routing parameters; each respective routing parameter of said plurality of routing parameters being expressed in a respective record; said differential indicating one of a difference between a first predetermined characteristic of a first record expressing a first said respective routing parameter and said first predetermined characteristic of a second record expressing a second said respective routing parameter and a difference between a second predetermined characteristic of a selected record expressing a selected said respective routing parameter and a predetermined threshold established with respect to said plurality of routing parameters;
comparing the determined differential to other previously determined differentials related to previously received routing parameters associated with the communications device;
selecting one of the routing parameters relating to a communications device based on said comparison; and
providing the selected routing parameter for routing of special number calls received from the communications device;
said differential comprising one of a difference between time stamps associated with said first record and said second record and a difference between time stamps associated with said selected record and said threshold.

2. A method in accordance with claim 1 wherein said routing parameter comprises a location of said communications device.

3. A method in accordance with claim 1 wherein said routing parameter comprises X/Y coordinates of the location of said communications device.

4. A method in accordance with claim 1 wherein said special number call comprises an emergency services call.

5. A method in accordance with claim 4 wherein said emergency services call is routed to a public safety answering point that serves the location of the communications device.

6. A method in accordance with claim 1 wherein said communications device comprises a voice over Internet Protocol (VoIP) device.

7. A method for automatically updating routing information for routing of special number calls comprising:
  receiving a plurality of routing parameters relating to a communications device from a plurality of sources;
  determining a differential related to the plurality of routing parameters; each respective routing parameter of said plurality of routing parameters being expressed in a respective record; said differential indicating one of a difference between a first predetermined characteristic of a first record expressing a first said respective routing parameter and said first predetermined characteristic of a second record expressing a second said respective routing parameter and a difference between a second predetermined characteristic of a selected record expressing a selected said respective routing parameter and a predetermined threshold established with respect to said plurality of routing parameters;
  comparing the determined differential to other previously determined differentials related to previously received routing parameters associated with the communications device;
  selecting one of the routing parameters relating to a communications device based on said comparison; and
  providing the selected routing parameter for routing of special number calls received from the communications device; said differential comprising one of a difference between certainty factors associated with said first record and said second record and a difference between a certainty factor associated with said selected record and said threshold.

8. A method in accordance with claim 7 wherein said routing parameter comprises a location of said communications device.

9. A method in accordance with claim 7 wherein said routing parameter comprises X/Y coordinates of the location of said communications device.

10. A method in accordance with claim 7 wherein said special number call comprises an emergency services call.

11. A method in accordance with claim 10 wherein said emergency services call is routed to a public safety answering point that serves the location of the communications device.

12. A method in accordance with claim 7 wherein said communications device comprises a voice over Internet Protocol (VoIP) device.

13. A method for automatically updating routing information for routing of special number calls comprising:
  receiving a plurality of routing parameters relating to a communications device from a plurality of sources;
  determining a differential related to the plurality of routing parameters; each respective routing parameter of said plurality of routing parameters being expressed in a respective record; said differential indicating one of a difference between a first predetermined characteristic of a first record expressing a first said respective routing parameter and said first predetermined characteristic of a second record expressing a second said respective routing parameter and a difference between a second predetermined characteristic of a selected record expressing a selected said respective routing parameter and a predetermined threshold established with respect to said plurality of routing parameters;
  comparing the determined differential to other previously determined differentials related to previously received routing parameters associated with the communications device;
  selecting one of the routing parameters relating to a communications device based on said comparison; and
  providing the selected routing parameter for routing of special number calls received from the communications device; said differential comprising one of a difference between reliability factors associated with said first record and said second record and a difference between a reliability factor associated with said selected record and said threshold.

14. A method in accordance with claim 13 wherein said routing parameter comprises a location of said communications device.

15. A method in accordance with claim 13 wherein said routing parameter comprises X/Y coordinates of the location of said communications device.

16. A method in accordance with claim 13 wherein said special number call comprises an emergency services call.

17. A method in accordance with claim 16 wherein said emergency services call is routed to a public safety answering point that serves the location of the communications device.

18. A method in accordance with claim 13 wherein said communications device comprises a voice over Internet Protocol (VoIP) device.

* * * * *